Dec. 15, 1936.  C. B. SPASE  2,064,499
CLUTCH
Filed Aug. 13, 1935
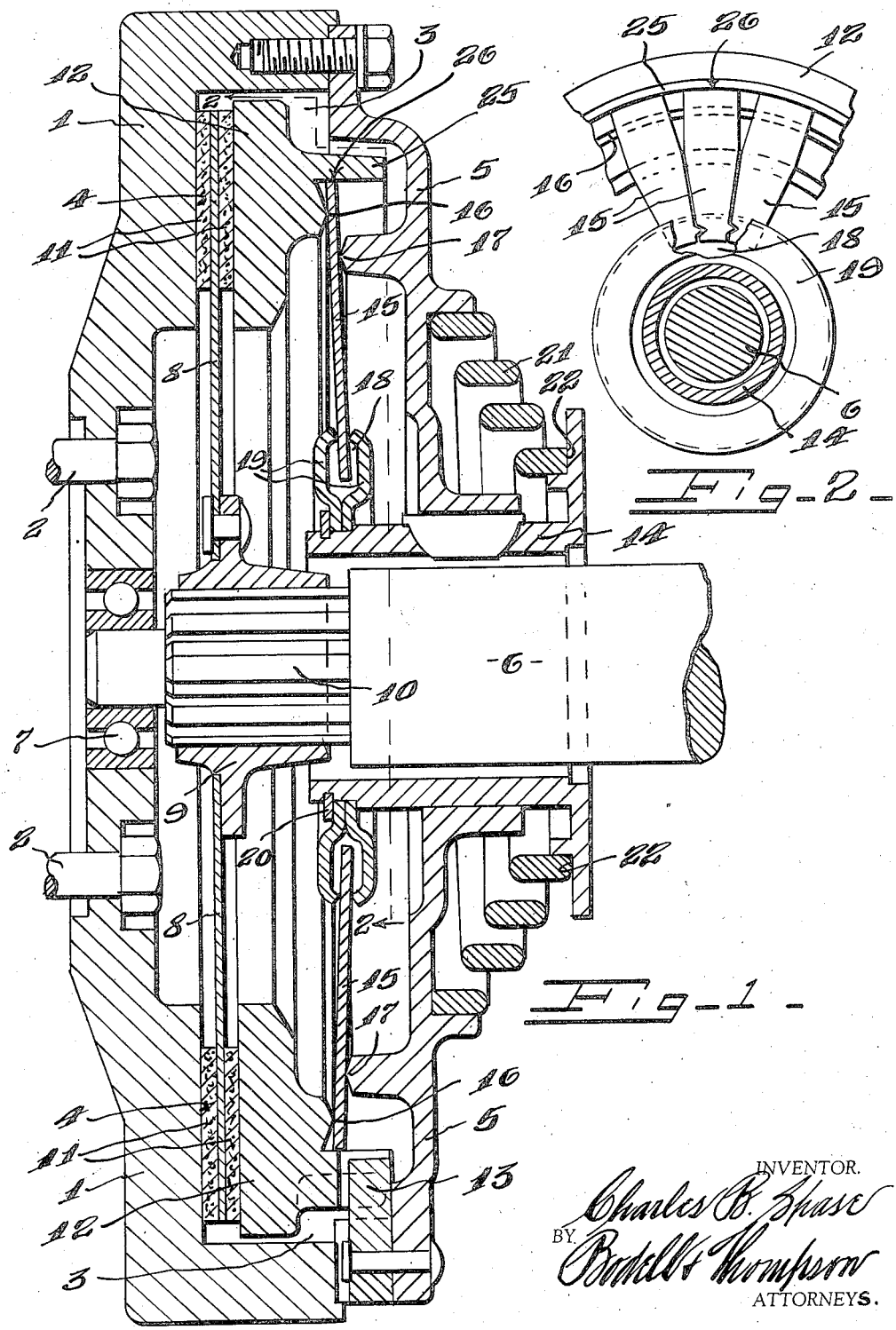

Patented Dec. 15, 1936

2,064,499

UNITED STATES PATENT OFFICE 2,064,499

CLUTCH

Charles B. Spase, Nedrow, N. Y., assignor to W. C. Lipe Inc., Syracuse, N. Y., a corporation of New York Application August 13, 1935, Serial No. 36,007

1 Claim. (Cl. 192—68)

This invention relates to friction clutches of the type shown in my pending application, Ser. No. 602,888, filed April 4, 1932, that is, a clutch embodying an axially shiftable pressure ring, a throw-out collar, spring means acting on the pressure ring to engage the clutch and clutch levers between the throw-out collar and the ring mounted to have an endwise thrust or slight shifting movement under the action of the centrifugal force; and has for its object an abutment means self-contained with the pressure ring and coacting with the extreme outer ends of the endwise shiftable levers, so that during the slight change of position thereof to take up the wear of the friction faces of the clutch, and also during movement of the levers in the type of clutch shown in my pending application, wherein the levers shift from one side to the other of the fulcrum plane, the points of pressure of the levers on the pressure ring and the self-contained abutment means do not change their relative positions to each other, and thereby the liability is avoided of relative change of position of the levers to such an extent that the levers may slip off the edge of their abutment and become disassembled under the centrifugal action and excessive wear of the friction faces of the clutch.

The invention consists in the novel features and in the combinations and constructions hereinafter set forth and claimed.

In describing this invention, reference is had to the accompanying drawing in which like characters designate corresponding parts in all the views.

Figure 1 is a diametric sectional view, partly in elevation, of a clutch embodying this invention.

Figure 2 is a sectional view on line 2—2, Figure 1.

1 designates the driving member of the clutch, this being usually in the nature of a small fly wheel secured in any suitable manner, as by bolts 2, to the crank shaft of the engine, with which the clutch is associated, the fly wheel being formed with a recess 3, the bottom face 4 of which constitutes the friction face of the driving member. The driving member is also provided with a back plate 5 closing the recess.

The driven member includes the clutch shaft 6 usually having a pilot bearing 7 in the driving member, and a disk 8 having a hub 9 slidably mounted on a splined portion 10 of the shaft 6 and also having friction facing rings 11 on opposite sides thereof, one of which coacts with the bottom face 4 of the recess 3 of the driving member.

12 designates the pressure ring mounted to have a slight axial shifting movement, it being suitably supported and interlocked at 13 with the driving member to rotate therewith.

14 designates the throw-out collar which is slidable axially of the clutch shaft 6. As here shown, it is mounted in the back plate 5 to rotate therewith and slide axially thereof.

15 designates the series of motion transmitting and multiplying levers for transmitting the motion of the throw-out collar to the pressure ring, these levers being mounted to have a slight endwise thrusting or shifting movement, coacting near their outer ends at 16 with the pressure ring to press thereon and also coacting at 17 with a fulcrum on the back plate 5, the levers having their inner ends located in a channel or groove 18 on the throw-out collar, here shown, as formed by two opposing rings 19 seated in a circumferential recess in the inner end of the throw-out collar and held assembled, as by a lock ring 20.

21 designates a clutch spring interposed between the back plate and throw-out collar and thrusting against the throw-out collar at 22 tending to move the throw-out collar 14 rearwardly or to the right, Figure 1, and hence move the inner ends of the levers 15 rearward or to the right, causing them to press on the fulcrum 17 and apply a force to the left on the pressure ring to engage the clutch. The clutch here shown is of the push-in type and upon pushing in of the throw-out collar against the action of the spring 21, the inner ends of the levers are moved to the left (Figure 1), thus releasing the pressure on the pressure ring permitting the clutch to disengage. The pressure ring has suitable springs tending to move it into disengaged position. These springs are not shown as they are old and well known in the art. Also, insofar as this invention is concerned, the arrangement of the clutch spring is immaterial and the clutch may be of the pull-out type. Also, the levers 15 move to the front or left hand side of the fulcrum plane when the clutch is disengaged so that the centrifugal force of the levers acts in opposition to the spring 21. This feature, per se, forms no part of the invention.

By "fulcrum plane" is meant a plane tangent to the fulcrum points 17 and at a right angle to the axis of the shaft 6.

The clutch construction thus far described is old, insofar as this invention is concerned.

This invention lies in the location of an abutment or means self-contained with the pressure ring or shiftable axially with the pressure ring for engaging the extreme ends of the levers 15.

25 designates an annular abutment or flange provided on the rear side of the pressure ring and against which the extreme outer ends of the levers 15 thrust, as at 26, it being understood that these levers are mounted to have an endwise thrust or movement, particularly under the action of the centrifugal force. Heretofore, the abutment has been mounted on the back plate structure, and hence, as the friction disks 11 wear, the relative positions of the levers 15 and fulcrum 16 may change to such an extent that the extreme ends of the levers may clear the edge of the flange, and hence, throw out of assembled position. Also, as the levers 15 fulcrum at 26, when the clutch is thrown out and the inner arms of the levers in front of the fulcrum plane, the relative position of the ends of the levers and the fulcrum 16 changes. The change of relative position of the levers and fulcrum is due to excessive wear of the friction faces 11 and also to change of position of the levers, when shifted to the front of the fulcrum plane, when the clutch is disengaged.

To avoid the disassembling of the levers, the ends of the levers have been thickened or curved or other special provision made. Therefore, by locating the abutment 25 on the pressure ring so as to move therewith or be self-contained therewith, the relation of the fulcrum 16 and the extreme ends of the levers at 26 does not change, while the clutch is taking up the wear; and also the centrifugal force of the levers, when the clutch is disengaged and the levers shifted in front of the fulcrum plane, in no way opposes the action of the levers under the centrifugal force in opposing the clutch spring 21 which tends to engage the clutch.

In clutches of the type shown in my pending application referred to, the centrifugal force acts in opposition to the clutch spring when the clutch is disengaged and hence the clutch levers or the inner arms thereof located in front of the fulcrum plane. In such construction where the annular abutment 25 is on the back plate, the levers can become effective at two fulcrum points, one at the extreme outer ends of the levers on the abutment on the back plate, and the other on the points of pressure of the levers on the pressure ring, and when the clutch is thus disengaged, instead of acting in opposition to the clutch spring to hold the clutch disengaged, acts to some slight extent with the clutch spring. By making the two pressure points, one of which is against the pressure plate, and the other of which is on the abutment self-contained with the pressure ring, the clutch levers, when disengaged and in front of the fulcrum plane and subject to the action of the centrifugal force, are ineffective to transmit any action thereof due to the centrifugal force to the pressure ring, and the full effect of their action under the centrifugal force, when in front of the fulcrum plane is to oppose the clutch spring.

The reason for opposing the clutch spring when the clutch is disengaged is to prevent drivers from unduly straining, and hence from breaking and stripping gears by engaging the clutch by releasing the clutch pedal after accelerating the engine to high speed, for the purpose of jumping the stalled vehicle from a standstill out of a rut or depression in the road.

What I claim is:—

In a clutch, the combination of driving and driven friction members, the driven member including a clutch shaft, a disk or friction plate rotatable with the shaft, an axially movable pressure ring, a throw-out collar rotatable with the driving member, motion transmitting levers extending outwardly from the throw-out collar and pressing near their outer ends against the pressure ring, the levers engaging each other at their sides so that the levers are held by each other from displacement in circumferential direction, and spring means acting on the throw-out collar tending to engage the clutch through said levers, all rotatable with the driving member, a fulcrum rotatable with the driving member and on which the levers fulcrum, said levers being mounted to shift endwise outwardly under the action of the centrifugal force, and means self-contained with the pressure ring for engaging the extreme ends of the levers.

CHARLES B. SPASE.